July 12, 1966  J. E. KEY, JR  3,259,990
CONTROL APPARATUS FOR BOREHOLE INSTRUMENTS
Filed Dec. 5, 1963  2 Sheets-Sheet 1
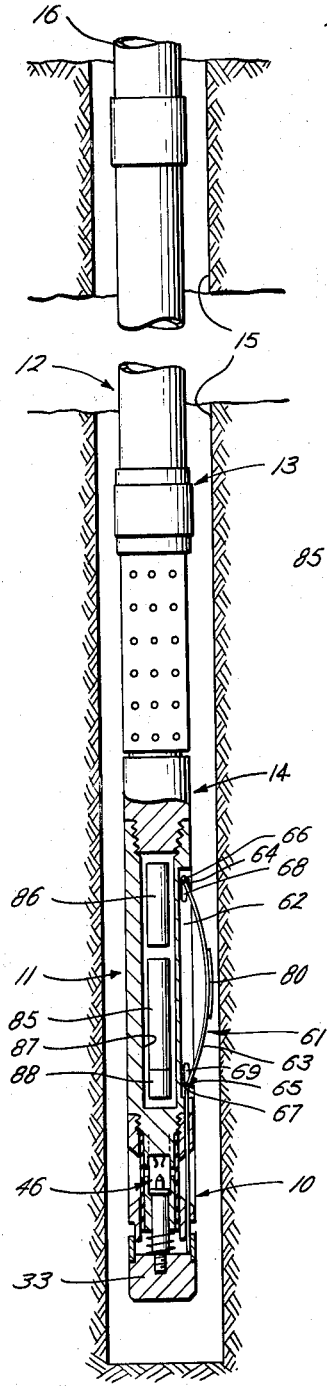
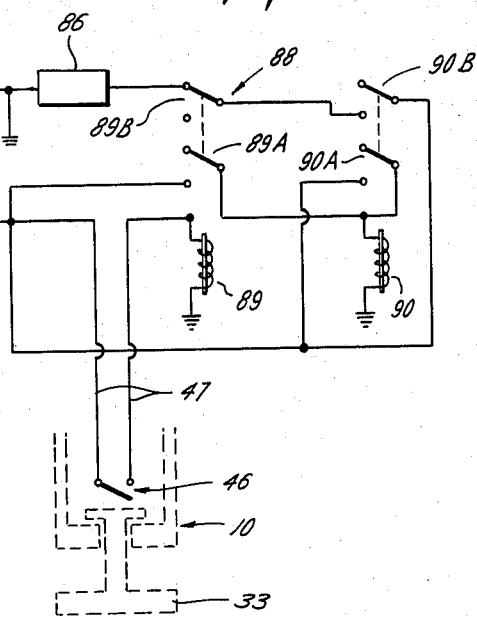
John E. Key, Jr.
INVENTOR.
BY
ATTORNEY

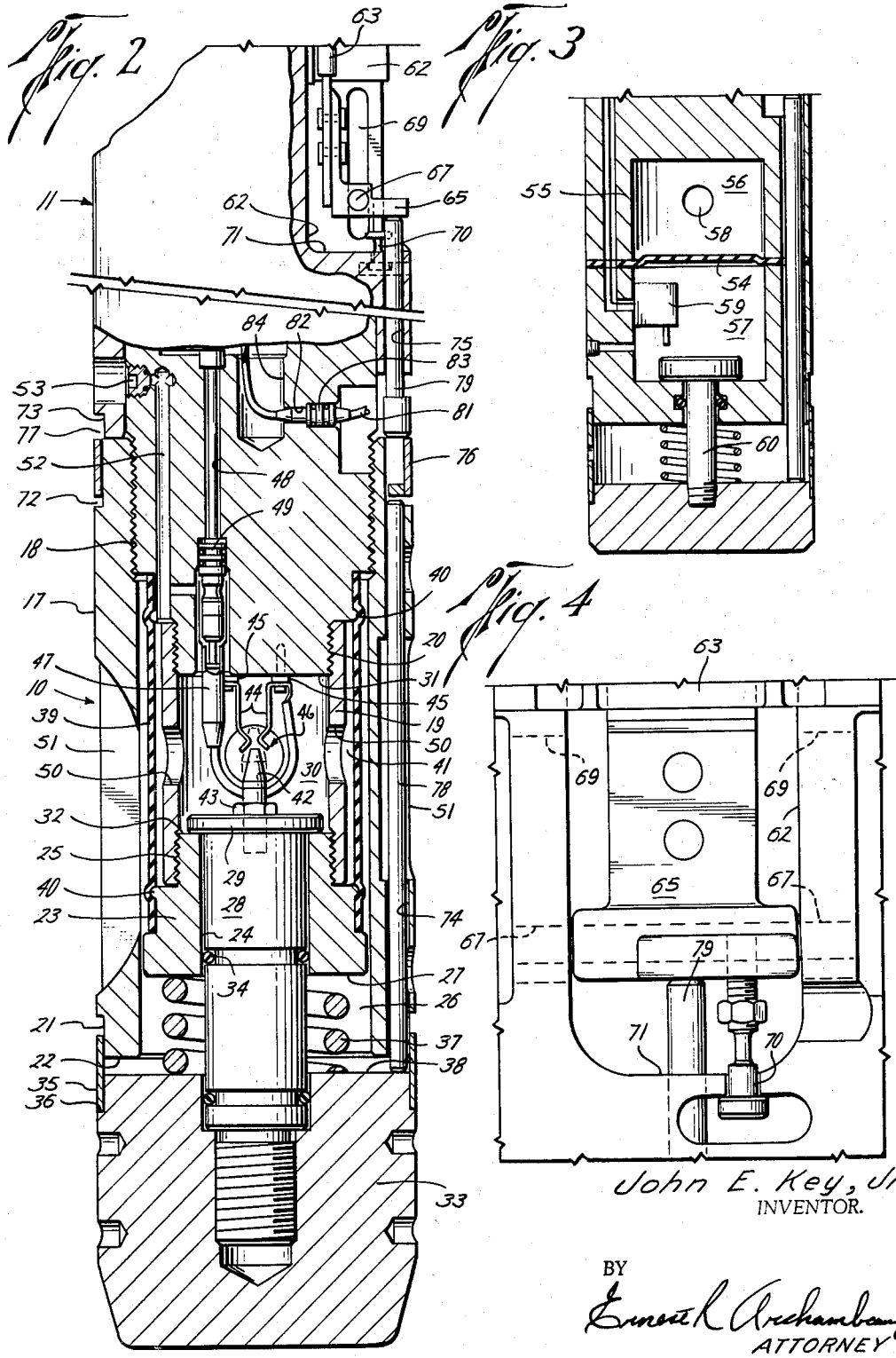

United States Patent Office 3,259,990
Patented July 12, 1966

3,259,990
CONTROL APPARATUS FOR BOREHOLE
INSTRUMENTS
John E. Key, Jr., Houston, Tex., assignor to Schlumberger Well Surveying Corporation, Houston, Tex., a corporation of Texas
Filed Dec. 5, 1963, Ser. No. 328,423
2 Claims. (Cl. 33—178)

This invention relates to apparatus for use in a borehole, and more particularly, to apparatus for controlling operation of instruments within a well bore.

It is common practice to pass borehole instruments through a well bore to obtain data relating to the fluid content and geological nature of the subterranean earth formations traversed by the well bore as well as to measure such variables as the bore diameter, vertical inclination or deviation of the well bore.

Such borehole instruments are typically suspended and passed through a well bore by use of an armored electrical cable spooled to a winch at the earth's surface. This cable provides an electrical communication path for transmitting power and signals between surface-located equipment and electrical circuitry contained in the instrument. Some borehole instruments also have one or more extendible arms or members movably attached to the instrument housing and arranged to be pressed against the wall of the well bore. These arms are used, for example, to maintain the instrument in a particular spaced position relative to the axis of a well bore, or are arranged to move relative to the instrument for measuring such variables as borehole diameters or the frictional drag of the instrument over the face of the well bore, as well as to carry detecting or sensing elements which, when pressed against the face of a well bore, detect certain parameters of subterranean earth formations.

As an instrument having such arms is being lowered into a borehole, it is preferred that these extendible arms be held in a retracted position against the side of the instrument housing to minimize the possibility that the arms will catch on obstructions along the well bore. After reaching a particular depth within a well bore, the extendible arms are then released and pressed against the wall of the well bore and the instrument moved upwardly.

Various means, such as complex mechanical linkages and self-contained electric motors, have been previously devised to manipulate such extendible arms. Furthermore, with respect to electrical control of such instruments, it has been necessary heretofore to depend upon electrical conductors within the armored suspension cable to provide a control path from the ground surface to the instrument. As the number of downhole electrical components increases, however, it becomes increasingly difficult to transmit a greater number of control or power signals since there is a practical limit to the number of electrical conductors which a cable can carry.

It should be appreciated also that where a borehole instrument is suspended from a string of drill pipe, it would not be practical to have conductors leading from the instrument to the surface of the ground.

It is, therefore, an object of the present invention to provide new and improved means for releasing extendible arms movably attached to a borehole instrument as well as for switching of electrical circuitry carried within such instruments independently of any surface-located control apparatus.

It is an additional object of the invention to provide a new and improved control apparatus for a borehole instrument which is actuated solely by physical manipulations of the instrument within a well bore.

It is a further object of the invention to provide a new and improved downhole electrical switching assembly for operating electrical circuitry in borehole instruments independently of any surface-located electrical control apparatus.

It is a further object of the invention to provide a new and improved control apparatus for a borehole instrument which apparatus is insensitive to pressures normally encountered in well bores.

It is another object of the invention to provide a new and improved mounting arrangement for well-engaging electrode pads which may be released by manipulations of a formation-logging instrument as it is within a well bore.

These and other objects of the present invention are obtained by apparatus adapted for mounting on a borehole instrument which includes a downhole switch operable by the physical manipulations of the apparatus as it is in the well bore.

The apparatus includes a plunger associated with an electrical switch, the plunger and switch being retained in an inoperative position by a resilient biasing means. When the plunger is brought into engagement with the bottom of the well bore or a bridge plug, it actuates the electrical switch to start electrical circuitry within the instrument. The plunger is also pressure balanced thereby permitting operation in high pressure boreholes.

Where the borehole instrument includes extendible arms or members, the plunger is also arranged to release the arms from their retracted position thereby permitting the arms to move into engagement with the wall of the well bore.

Additional objects and advantages of the invention will become apparent from the following detailed description of representative embodiments thereof, taken in conjunction with the accompanying drawings, in which:

FIG. 1 illustrates a borehole instrument equipped with the control apparatus and disposed in a well bore;

FIG. 2 shows a preferred embodiment of a control apparatus employing the principles of the invention;

FIG. 3 shows a partial view of an alternate embodiment of a control apparatus employing the principles of the invention;

FIG. 4 shows an enlarged view of a preferred arrangement for mounting the shear pin employed in the releasing mechanism; and FIG. 5 shows a holding circuit for use with the control apparatus and borehole instrument.

In FIG. 1, a control apparatus 10 exemplifying the principles of the present invention is illustrated attached to the lower end of a borehole instrument 11 depending from a drill-stem tester 12 which includes a packer 13. The assembled tool 14 is suspended in well bore 15 at the end of a string of drill pipe 16.

Referring now to FIG. 2, the control apparatus 10 includes an outer housing or cylindrical sleeve 17 which is threadingly engaged at 18 to the lower plug end of borehole instrument 11. A second inner cylindrical sleeve 19, concentrically disposed within and radially spaced from housing 17, is also threadingly engaged at 20 to the lower end of borehole instrument 11. Apparatus housing 17 is appreciably longer than the inner sleeve 19 and is terminated at its lower end by a reduced outer diameter portion 21 and a downwardly-facing shoulder 22. A cylindrical plug 23 having an axial bore 24 is threadingly engaged at 25 to the lower end of inner sleeve 19 and defines a spring recess 26 between the lower face 27 of plug 23 and the inner walls of apparatus housing 17.

Sealingly received in axial bore 24 is a reciprocable plunger member 28 which extends through bore 24 and projects outwardly below the lower-end shoulder 22 of apparatus housing 17. The plunger member has a first enlarged shoulder portion 29 at its upper end disposed in the chamber 30 formed between the inner walls of inner sleeve member 19, the lower end face 31 of the borehole instrument 11, and the upper face 32 of plug 23. At its outer or lower end, plunger member 28 is threadingly attached to a second enlarged shoulder portion or bore-contacting member 33. A sealing member, such as an O-ring 34, seals plunger member 28 relative to cylindrical plug 23 where the plunger passes through axial bore 24.

The bore-contacting member 33 is preferably guided relative to the apparatus housing 17 by a skirt portion 35 which encircles the bore-contacting member 33 and is engaged against an upwardly-facing peripheral shoulder 36 on the member 33. The skirt 35 fits closely over reduced diameter portion 21 of apparatus housing 17 to axially guide plunger member 28 as it travels.

A compression spring 37, received within spring recess 26 and engaged between the lower face 27 of plug 23 and the upper face 38 of bore-contacting member 33, urges plunger member 28 outwardly until enlarged shoulder portion 29 of plunger 28 engages the upper face 32 of plug 23.

A cylindrically-formed resilient sleeve 39 disposed in the annular space between inner sleeve member 19 and apparatus housing 17 is sealingly secured at its ends to rounded peripheral shoulders 40 on the lower plug end of borehole instrument 11 and the plug 23. Resilient sleeve 39 completely encloses inner sleeve member 19 and it will be appreciated that an inner sealed chamber 41 is accordingly defined within chamber 30 by the resilient sleeve 39, plug 23, seal 34, plunger 28, and the lower face 31 of borehole instrument 11.

A male electrical conductor member 42 mounted on an insulator 43 is secured to the upper end 29 of plunger member 28 in axial alignment with the plunger member. The male conductor 42 is adapted for insertion between and engagement with two or more spaced resilient electrical-contact members 44 dependently attached to insulators 45 secured to the lower face 31 of borehole instrument 11. Conductor member 42 and resilient contacts 44 comprise electrical switch 46. Conductors or wires 47 connected to contacts 44 enter a conductor passage 48 formed in the lower plug end of borehole instrument 11 and are sealed into the passage by a conductor sealing plug 49. Thus, it will be understood that whenever plunger member 28 is moved to its uppermost position, as shown by dashed lines in FIG. 2, male conductor 42 will bridge the space between contacts 44 to complete an electrical path between wires 47. It will be appreciated that although it is not essential to axially align the male conductor 42 and the contacts 44, such alignment makes it possible to attach the control apparatus 10 to the borehole instrument 11 with assurance that the male conductor 42 will engage the contacts 44 irrespective of the finally-assembled relative angular relationship of the apparatus to the borehole instrument. It should be further appreciated that although it is preferred to use this type of foolproof and durable switching arrangement, it would be equally feasible to use a conventional sealed, spring-biased, momentary-contact switch with an actuator arranged to be engaged by the upper end of the plunger when it reaches the upward extent of its travel.

It will be appreciated that pressures normally encountered in deep well bores would normally overcome the spring 37 and force the plunger member 28 upwardly and hold skirt 35 against the downwardly-facing shoulder 22 of outer housing 17. Of course an extra-strong spring could be used in some cases to prevent this, but this is not particularly desirable. According to the invention, therefore, it is preferred instead to make spring 37 relatively light and balance the pressure forces acting on plunger member 28. Such pressure balancing may be accomplished by providing ports 50, 51 in the inner and outer housing or sleeve members, respectively, and filling the inner sealed chamber 41 through a fill passage 52 with an electrically non-conductive liquid (not shown) and then closing passage 52 with a plug 53. All other openings to the inner sealed chamber 41 are sealed as by conductor seal plug 49 and O-ring 34 around plunger member 28. Ports 51 in the outer housing or sleeve member 17 place the outer surface of resilient sleeve 39 in fluid communication with the exterior of the apparatus 10. It will be understood, therefore, that when the control apparatus 10 is being used within a fluid-filled well bore, the well bore pressure will be transmitted from the well fluids surrounding resilient sleeve 39 through the sleeve to the non-conductive liquid in the sealed chamber 41. This transmitted pressure acting on the upper or inner end 29 of the plunger member 28 will balance the pressure forces acting on the lower or outer end 33 of the plunger. Thus, it will be appreciated that spring 37 will not be required to counteract the pressure forces acting on the bore-contacting member 33; and that to operate the switch 46, only the force of the spring 37 itself need be overcome.

It should be appreciated, of course, that other means of pressure-balancing can be employed. For example, the diaphragm or resilient sleeve 39 could be eliminated and well fluids permitted to enter chamber 30 through port 51 in the side of outer sleeve 17, but this would permit such fluids to short-circuit switch 46 unless the switch were pressure-sealed and isolated from the electrically-conductive well fluids.

It is preferred, therefore, that a pressure-balanced arrangement of some type be used which also isolates the switch from such undesirable fluid contact. As seen in FIG. 3, this pressure-balancing feature can also be achieved with a flat, transversely-extending, resilient diaphragm 54 stretched across and sealingly attached to the inner walls of inner sleeve member 55 to form separate upper 56 and lower chambers 57. The upper chamber 56 would be left in fluid communication with the well bore through ports 58 and the lower chamber 57 would be sealed and filled with an electrically non-conductive fluid for balancing of the plunger member. A sealed momentary-contact switch 59 would be disposed in the lower chamber 57 with its actuator arranged for engagement as the plunger reaches the upper limit of its travel. It should be realized that switch 59 could also be disposed in the open upper chamber 56 and arranged so that the upper end of plunger 60 would engage the switch actuator through the resilient diaphragm.

The pressure-balanced switches as described above can obviously be used to control any electrically-operated borehole instrument. As previously described, however, many borehole instruments require an externally-arranged extendible arm assembly. According to the present invention, therefore, it is preferred that such extendible arms be arranged as illustrated in FIG. 2.

As seen in FIGS. 1 and 2, a movable arm assembly 61 is movably attached on one side of borehole instrument 11 and so arranged that it may be held in a retracted position within a longitudinally-extending recess 62 and selectively released therefrom to permit it to assume its expanded position. An outwardly-bowed spring 63 is positioned lengthwise of the instrument 11 with the longitudinal axis of the spring 63 parallel to the longitudinal axis of the control apparatus 10 and borehole instrument 11. Each end of spring 63 is affixed to hinge members 64, 65, each of which has a pin member 66, 67 extending transversely to the longitudinal axis of the spring. These pins 66, 67 are slidably mounted in pairs of longitudinal slots 68, 69 cut in the opposing faces of recess 62 at each end of the recess. Thus, when released, bowed spring 63 is free to move longitudinally along slots 67, 68 with respect to borehole instrument 11 and control apparatus 10.

The arm assembly 61 is preferably maintained in an extended position as the assembled tool is being lowered into a well bore. The bowed spring 63 is held in this extended position by a frangible member, such as a shear pin or screw 70, connecting lower hinge member 65 to the lower face 71 of spring recess 62 (see FIG. 4).

At the upper end of outer housing 17, a reduced diameter portion is provided at 72. A corresponding reduced diameter portion 73 is provided around the lower plug end of borehole instrument 11. A first longitudinally-extending bore 74 is provided along one side of outer housing sleeve 17 and extends from the lower end of apparatus housing 17 to the upwardly-directed face of reduced diameter portion 72 at the upper end of apparatus housing 17. A second longitudinally-extending bore 75 is similarly provided along one side of the lower plug end of borehole instrument 11. This latter longitudinal bore 75 extends from the upper face of reduced diameter portion 73 to the lower face 71 of housing recess 62 at a point directly under lower hinge member 65.

An annular collar 76 is slidably mounted around the upper end of apparatus housing 17 and arranged for reciprocal travel within the peripheral groove 77 formed by reduced diameter portions 72, 73. A first thrust rod member 78 is received in longitudinal bore 74 and so arranged that its lower end end rests on upper face 38 of bore-contacting member 33 and its upper end is engaged with the lower side of collar 76. A second thrust rod 79 is received within longitudinal bore 75 and so arranged that its lower end rests on the upper side of collar 76 and its upper end is in engagement with lower hinge 65. Thus, it will be appreciated that whenever bore-contacting member 33 is moved upwardly, thrust rod 78 will be accordingly forced upwardly against collar 76 to move the collar upwardly and force thrust rod 79 against lower hinge member 65 to break shear pin 70. It will be realized that appreciable misalignments of the longitudinal bores relative to each other and the thrust rods therein accordingly will not affect the smooth operation of the releasing mechanism. It will be understood, of course, that a single thrust rod extending from upper face 38 of bore-contacting member 33 to lower hinge member 65 would serve equally well so long as longitudinal bore 74 was substantially aligned with longitudinal bore 75.

Other equivalent releasable latching means other than a shear pin can, of course, be employed. For example, a spring-biased latch or a pivoted dog could be used to hold lower hinge member 65 until the latch or dog was moved out of the way by the upward movement of thrust rod 79.

Regardless of which releasable latching means is employed, whenever bore-contacting member 33 is pressed upwardly, lower hinge member 65 will be freed to permit bowed spring 63 to assume its natural expanded position, as shown in FIG. 2.

It will be appreciated that since upper hinge member 64 normally remains in the lower end of the upper pair of slots 68 as the assembled tool is raised out of the borehole, the upper hinge member 64 could be pivotally connected to borehole instrument 11 rather than being received in the upper pair of slots 68. It is preferred, however, to include the upper pair of slots 68 to enable arm assembly 61 to respond whenever the borehole instrument contacts an obstruction, as well as to permit the tool to be lowered with the arm assembly expanded. It should be clear that when the tool is lowered, the arm assembly will then shift upwardly relative to the tool so that the lower hinge member 65 will then remain at the top of the lower slots 69 and the upper hinge member 64 will instead shift freely in upper slots 68.

If the borehole instrument is a formation-logging instrument including a formation-resistivity device, the arm asembly 61 will carry thereon an insulated pad member 80 in which spaced electrodes (not shown) are embedded. This insulated pad member 80 is, of course, pressed against the face of the well bore upon release of arm assembly 61. Conductors 81 connecting the spaced electrodes to the instrument enter the instrument housing through a conductor passage 82 which is sealed by conductor sealing plug 83 and pass on into a central conductor passage 84 running along the axis of the borehole instrument. Similarly, conductors 47 leading from switch 46 in control apparatus 10 enter conductor passage 84 where they join conductors 81 and are electrically connected to batteries 85 and formation-logging circuitry 86 carried within a sealed chamber 87 in the body of borehole instrument 11.

It will be appreciated that while I have shown a bowed spring for the arm assembly, the arm assembly could be comprised of rigid arms movably connected to each other and to the instrument housing with spring means arranged to bias the arms outwardly upon their release. For example, an arm assembly could be used similar to the one shown in Patent No. 3,023,508 by Dean F. Saurenman for "Single Arm Borehole Apparatus." Also, several arm assemblies could be spaced around the instrument housing and arranged for simultaneous or individual release in the manner described herein.

Other obvious modifications of the switching apparatus can be made which would still be within the spirit and scope of the invention. For example, the bore-contacting member can be a flat plate pivotally attached at one end thereof to the lower face of the apparatus housing. The plunger member would be loosely coupled to the flat plate and have a compression spring encircling the plunger member as in the preferred embodiment. The thrust rod would rest on the upper face of this flat plate. Another modification would be to provide the plunger with either coarse threads or helical flutes arranged in complementarily-shaped threads or flutes in the axial bore through the lower end of the apparatus housing. Teeth on the lower face of the bore-contacting member would permit the plunger to be held engaged with the bottom of the well bore as the apparatus housing was rotated relative to the plunger. A momentary-contact switch disposed within the sealed chamber would be arranged so that when the inner end of the plunger had moved a certain distance into the sealed chamber, the switch would be engaged and closed.

The relay assembly or holding circuit 88, as illustrated in FIG. 5, will maintain power from batteries 85 to the electrical circuitry 86 carried within the borehole instrument after the initial engagement of contact member 33 with the bottom of the borehole. The relay assembly includes a starting relay 89 and a holding relay 90 both of which are conventional double-pole double-throw relays. Conductors 47 from switch 46 connect the coil of relay 89 with the power supply or batteries 85 carried within the instrument whenever switch 46 is closed to energize relay 89. Relay switch 89A closes and completes a path between the power supply 85 and the coil of relay 90 which energizes that relay. Relay switch 90A is thereby closed to complete another path from the power supply 85 to the coil of relay 90. Relay switch 90B is also closed at the same time which would complete a path from the power supply to electrical circuitry 86 if it were not for the fact that relay switch 89B is now opened. It will be appreciated, therefore, that as soon as relay switch 89B is closed by opening switch 46 and subsequently de-energizing relay 89, a complete path will be made from power supply 85 through relay switch 90B and relay switch 89B to electrical circuitry 86.

The borehole instrument can be any type of formation-logging or testing instrument which may be, for example, of the type shown and described in Patent No. 2,669,688 by H. G. Doll. It will be appreciated, however, that other types of borehole instruments may be used in conjunction with the novel apparatus. For example, the borehole instrument could be one for measuring or calipering the diameter of a well bore at various portions thereof, such as the one also shown and described in Patent No. 2,669,688 to Doll. The instrucent could also be one employing the apparatus and methods disclosed in Patent No.

3,120,122 by Frank P. Kokesh for "Methods and Apparatus for Investigating Earth Formations."

Although the invention has been described in conjunction with a separate housing arranged to be dependently attached to a well tool suspended from a string of drill pipe, it should be understood that the principles of the present invention could be used in other comparable embodiments. For example, the well tool could be suspended from a conventional armored electrical cable. Also, the apparatus of the invention could be incorporated into a unitary housing for either type of well tool without departing from the scope and spirit of the invention.

Thus, the apparatus when employed with a borehole instrument will permit the instrument to be lowered to a selected depth with the extendible arms thereon held in a retracted position against the housing. Upon reaching the bottom or a bridge plug within the well bore, the bore-contacting member is placed into contact therewith so that the weight of the instrument presses the bore-contacting member against the biasing force of the compression spring to close the momentary-contact switch as well as to force the thrust rods upwardly to release the latching mechanism holding the sliding end of the bowed spring in its extended position and permit the arm assembly to move outwardly and press against a face of the borehole adjacent thereto. It should be understood that although the momentary-contact switch opens when the bore-contacting member is disengaged from contact with the well bore, convetnional timer switches or holding relay arrangements, such as the one shown in FIG. 5, connected to the instrument's circuitry will continue the operation of the instrument after the momentary-contact switch reopens. The borehole instrument will then be operated in its usual manner, and retrieved from the well bore when desired.

It will be appreciated, therefore, that the addition of the control apparatus of the present invention to conventional borehole instruments will serve to eliminate the need for either running conductors along or through a string of drill pipe or the necessity for providing separate electrical conductors in the suspension cables for self-powered instruments, will provide a control mechanism capable of being controlled from the ground surface by manipulating the instrument with respect to the borehole and provide means for the selective extension of extendible members of arms without requiring either elaborate mechanisms or self-contained electric motors.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A control apparatus for borehole instruments including: a housing having a cavity therein, said housing having an upper end adapted for dependent coupling to a borehole instrument and a lower end defining a bore extending longitudinally between said cavity and the exterior of said housing; electrical switch means disposed in said cavity, said switch means being adapted for electrical connection in an electrical circuit for controlling the operation of such electrical circuit; an elongated plunger slidably received in said bore for travel between longitudinally-spaced positions relative to said housing, said plunger having an inner end extending into said cavity and an outer end extending outwardly from said lower housing end, said outer end being so arranged where engagement with a borehole obstruction forces said plunger inwardly into said cavity, said inner end being operatively positioned relative to said switch means for operating said switch means at one of said positions of said plunger; resilient biasing means for normally biasing said plunger toward the other of said positions; stop means for limiting travel of said plunger to said other position; an extendible arm means disposed lengthwise of said housing with the longitudinal axis of said arm means in a plane including the longitudinal axis of said housing, said arm means having at least one end movably connected to said housing, said movably-connected end being arranged so that said arm means can move between a first position along said housing and a second position where at least a portion of said arm means projects outwardly from said housing; means on said housing releasably holding said arm means in said first position; and means on said housing responsive to travel of said plunger to said one position for releasing said holding means, said travel-responsive means including at least two slidable members tandemly disposed between said plunger and said holding means for travel between longitudinally-spaced positions relative to said housing so that longitudinal travel of one of said slidable members will be translated into an equivalent longitudinal travel of the other of said slidable members.

2. A control apparatus for borehole instruments including: a housing having a cavity therein, said housing having an upper end adapted for dependent coupling to a borehole instrument and a lower end defining a bore extending longitudinally between said cavity and the exterior of said housing; electrical switch means disposed in said cavity, said switch means being adapted for electrical connection in an electrical circuit for controlling the operation of such electrical circuit; an elongated plunger slidably received in said bore for travel between longitudinally-spaced positions relative to said housing, said plunger having an inner end extending into said cavity and an outer end extending outwardly from said lower housing end, said outer end being so arranged where engagement with a borehole obstruction forces said plunger inwardly into said cavity, said inner end being operatively positioned relative to said switch means for operating said switch means at one of said positions of said plunger; resilient biasing means for normally biasing said plunger toward the other of said positions; stop means for limiting travel of said plunger to said other position; an elongated arm means disposed lengthwise of said housing with the longitudinal axis of said arm means in a plane including the longitudinal axis of said housing, said arm means having a first and second end movably connected to said housing, said movably-connected ends being arranged so that said ends can be disposed in an extended first position relative to one another to place said arm means along said housing and in a contracted second position relative to one another to project said arm means outwardly from said housing; means on said housing releasably holding said first and second ends in said first position; and means in said housing responsive to travel of said plunger to said one position for releasing said holding means, said movement-responsive means including at least two slidable rod members tandemly disposed between said plunger and said holding means for travel between longitudinally-spaced positions relative to said housing, and at least one slidable member intermediate said rod members and operatively disposed therebetween so that longitudinal travel of one rod will be translated through said slidable member into an equivalent longitudinal travel of the other of said rods.

References Cited by the Examiner

UNITED STATES PATENTS 2,854,758 10/1958 Owen _____ 33—178
2,908,085 10/1959 Price et al. _____ 33—178

FOREIGN PATENTS 560,200 3/1944 Great Britain.

LEONARD FORMAN, *Primary Examiner.*

ISAAC LISANN, *Examiner.*

W. K. QUARLES, JR., *Assistant Examiner.*